(12) United States Patent
Catbagan

(10) Patent No.: US 6,220,092 B1
(45) Date of Patent: Apr. 24, 2001

(54) DRYER WITH AN AIR FLOW TESTING DEVICE

(76) Inventor: Alfonso B. Catbagan, 3772 Candy Ct., #101, Virginia Beach, VA (US) 23455

( * ) Notice: Subject to any disclaimer, the term of this patent is extended or adjusted under 35 U.S.C. 154(b) by 0 days.

(21) Appl. No.: 09/163,174

(22) Filed: Sep. 30, 1998

(51) Int. Cl.[7] ............... G01F 23/02; G01F 15/00; F26B 19/00
(52) U.S. Cl. .................. 73/323; 34/89; 116/274
(58) Field of Search .............. 73/861.79, 861.77, 73/861.01, 273, 861.32, 861.33, 323, 385, 334; 34/82, 87, 88, 89; 116/264, 273, 276

(56) References Cited

U.S. PATENT DOCUMENTS

| | | | |
|---|---|---|---|
| 2,915,606 | 12/1959 | Knauth | 200/87 |
| 3,185,128 | * 5/1965 | Moore et al. | 116/274 |
| 3,953,819 | 4/1976 | Keerie et al. | 338/36 |
| 4,147,057 | 4/1979 | Palmer | 73/189 |
| 4,227,315 | * 10/1980 | Heght | 34/82 |
| 4,745,877 | * 5/1988 | Chang | 116/274 |
| 4,793,190 | * 12/1988 | Chang | 73/861.33 |
| 5,042,170 | * 8/1991 | Hauch et al. | 34/82 |
| 5,249,464 | * 10/1993 | Brown et al. | 73/323 |
| 5,497,563 | * 3/1996 | Mayfield | 34/82 |
| 5,645,011 | * 7/1997 | Winkler et al. | 116/264 |
| 5,664,339 | * 9/1997 | Swanson et al. | 34/82 |
| 5,721,383 | 2/1998 | Franklin et al. | 73/861.77 |

* cited by examiner

*Primary Examiner*—Benjamin R. Fuller
*Assistant Examiner*—Jagdish Patel
(74) *Attorney, Agent, or Firm*—Patent & Trademark Services; Thomas Zack; Joseph H. McGlynn

(57) ABSTRACT

An air flow testing device for use with a clothes dryer to indicate an obstruction in the exhaust system. Three potential states of exhausted air are monitored by the testing device when the dryer's lint screen is removed from its opening. In the first state, when the exhaust system is unobstructed, an impeller of the device freely turns within a casing held against the lint screen opening as the dryer is operating. In the second state, when the exhaust system is blocked, the same impeller remains static and does not rotate. In the third state when the exhaust system is partially blocked, the impeller moves and may stop. If either a fully or partially blocked state is detected, a user can simply clear the system including the tubing and flapper to resolve this common dryer problem without calling in a repair person.

3 Claims, 2 Drawing Sheets

DRYER WITH AN AIR FLOW TESTING DEVICE

BACKGROUND OF THE INVENTION

Clothes dryers are well known and generally perform as expected. There are, however, some persistent operational complaints which often result in the calling of a repair person to fix. Among these often hear complaints are that: the dryer takes too long to dry the clothing; the dryer is heating but not drying the clothes; the user needs to run the dryer twice before the clothing get dry; and the dryer is too warm but the clothing is still damp. The root causes of these common complaints is that the exhaust vent system for the heated gas or electric dryer has become either partially or completed obstructed by lint and other material. All of these common dryer problems can easily be repaired at a modest cost once the cause of the problem is known.

The present invention is directed to an invention specify designed to be used by a homeowner to test whether there is any blockage of a clothes dryer's exhaust vent system which then permits the solving of the recited dryer problems without having to call a repair person as will be described hereafter.

DESCRIPTION OF THE PRIOR ART

Devices used to measure gas flow for are known. For example, in the Knauth invention (U.S. Pat. No. 2,915,606) a flowmeter is disclosed which translates rotary motion of a shaft to linear motion outside of the flow passage without providing a mechanical connection through the wall of the flow passage.

The Keerie patent (U.S. Pat. No. 3,953,819) discloses a flow sensor for producing an electrical signal dependent upon fluid flow has a housing insertable in a bore extending transversely to and intersecting a flow passage in a port plate.

In U.S. Pat. No. 4,147,057 to Palmer a wind component anemometer for measuring the component of air or fluid speed along its axis of rotation where there is disclosed a plurality of generally radially directed helicoidal airfoils.

In the Franklin et al. reference (U.S. Pat. No. 5,721,383) there is disclosed a flow meter system and method for detecting the movement of a substance through a conduit with a sensing device partially within the flow path.

The present invention relates to a flow tester used with a clothes dryer to detect whether there is no, a total or a partial blockage of the dryer's air flow exhaust vent path all as more fully set forth in this specification.

SUMMARY OF THE INVENTION

This invention relates to an air flow testing device used with a clothes dryer to indicate the degree, if any, of the passage of air from the dryer's exhaust vent.

It is the primary object of the present invention to provide for a simple air flow testing device that can easily be used with a clothes dryer to detect degrees of obstruction of the exhaust venting system.

Another object is to provide for such a device wherein the testing device has a housing made of a clear transparent material to permit the viewing of an internal impeller.

These and other objects and advantages of the present invention will become apparent to readers from a consideration of the ensuing description and the accompanying drawings.

DESCRIPTION OF THE PREFERRED EMBODIMENT

Figure 1:
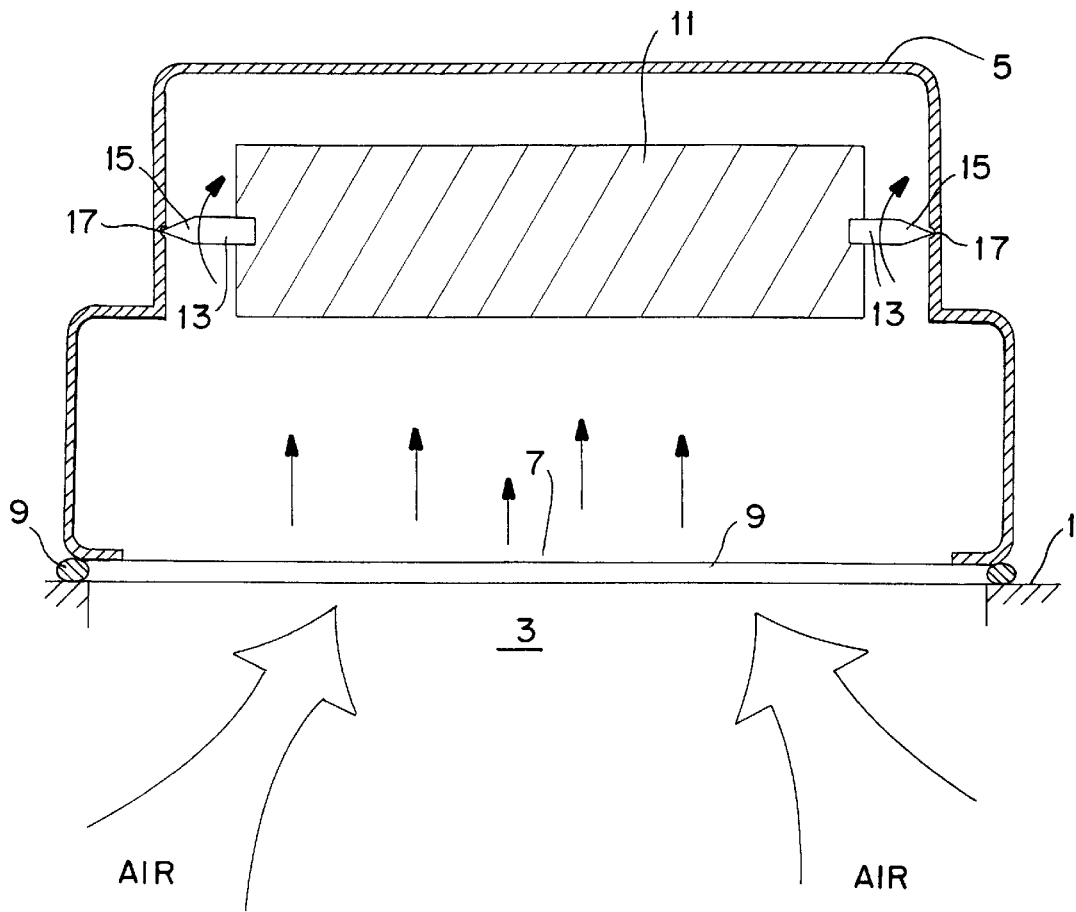
FIG. 1 is a side view of the invention's preferred embodiment.

FIG. 1 is a side view of the invention's preferred embodiment. A clothes dryer 1 has its lint screen opening 3 unobstructed by removing the lint screen (not shown) normally placed in the opening. Placed against this opening 3 is the clear transparent plastic housing or casing 5. At the engaging lower portion of the casing 5 there is an opening 7 around whose perimeter a foam or rubber seal 9 extends. This seal 9 engages the perimeter of the dryer opening 3 by pressing the casing down against the dryer to form an air tight seal between the casing 5 and the unobstructed dryer opening 3.

The casing 5 is generally closed except for the opening 7. Within the casing 5 is an impeller or impeller blade 11 made of very thin plywood or other material which is in fluid communication with the exhausted air from the dryer. This generally thin rectangular impeller blade 11 is rotatably journal led at both of its opposite ends near the adjacent interior casing walls by two opposite identical pivot members 13. Each pivot member 13 is fixed to the impeller 11 at one end and has a conical shaped wire end 15 at the other end whose outer pointed end engages a slight indentation 17 in the adjacent interior side of the wall of casing 5. With this mounting of the impeller 11 to the casing, minimal frictional resistance is encountered to the rotation of the impeller around its end supporting end members 13 within the casing as air flows from the dryer into the casing in the direction of the arrows. Thus, even the slightest movement of air from the clothes dryer's opening 3 will result in some rotational movement of the impeller blade 11 which then can be visually observed through the clear casing 5 by a user.

Figure 2:
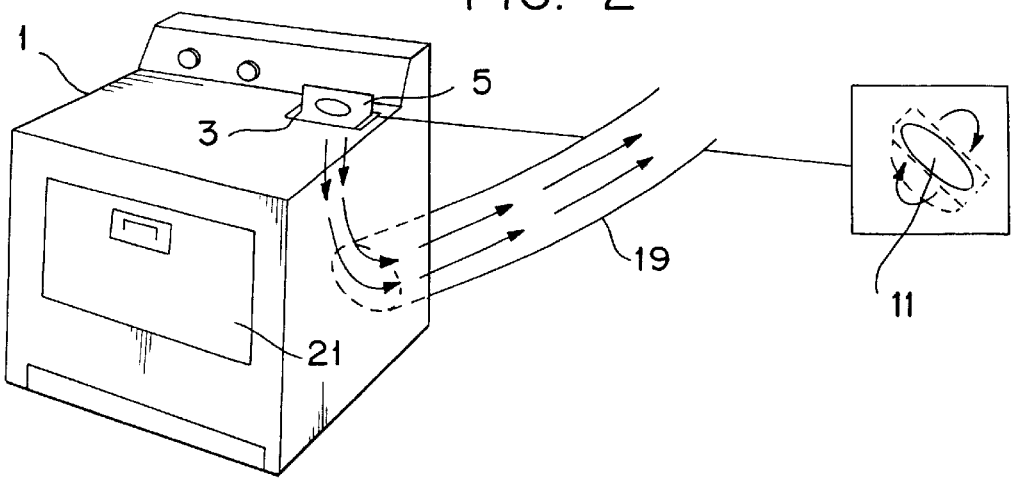
FIG. 2 is a side view of the FIG. 1 preferred embodiment as used with a clothes dryer whose exhaust vent is unobstructed with an enlarged view of the action of the invention's impeller to the right.

FIG. 2 is a side view of the FIG. 1 preferred embodiment as used with a clothes dryer 1 whose attached exhaust vent system or exhaust system 19 is unobstructed with an enlarged view of the action of the invention's impeller 11 to the right. In this view the typical dryer has its lint screen opening 3 on the top of the dryer that has a front loading door 21. The lint screen has been removed from this opening and is not shown. Placed over the opening 3 is the casing 5 with its lower opening 7 (see FIG. 1) and seal 9 covering the opening 3 to form an air tight seal around it. The internal air flow from the operating dryer to the exhaust system 19 is shown by the arrows. To the right in this unobstructed state of exhaust gas flow, it is seen that the impeller 11 is continuously spinning around its two opposite side mounting pivots 13. This tells a user that there is no problem with the flow of heated exhaust air from the dryer to the outside and eliminates this common cause.

Figure 3:
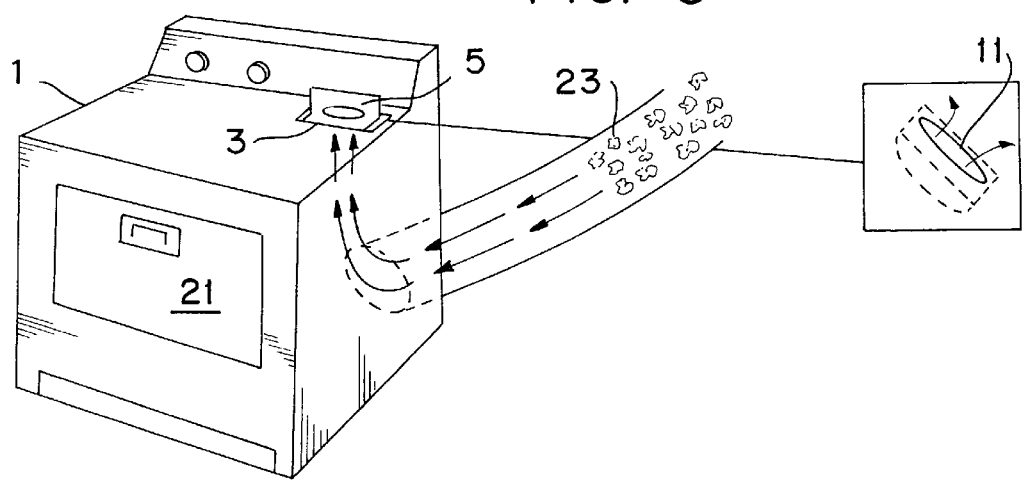
FIG. 3 is a side view of the preferred embodiment of the invention and the FIG.2 clothes dryer whose exhaust vent is obstructed with an enlarged view of the action of the invention's impeller to the right.

FIG. 3 is a side view of the preferred embodiment of the invention and the FIG.2 clothes dryer whose exhaust vent is now obstructed with an enlarged view of the action of the invention's impeller to the right. This is the same operating dryer and exhaust system as in FIG. 2 but in this operational mode the exhaust system is totally blocked or obstructed by lint and other foreign objects 23 somewhere within the exhaust system 19. As shown in the enlargement to the right, in this obstructed state the impeller does not move or rotate about is two pivotal members. Therefore, no arrows are shown indicating any movement of the visually observable impeller.

Figure 4:
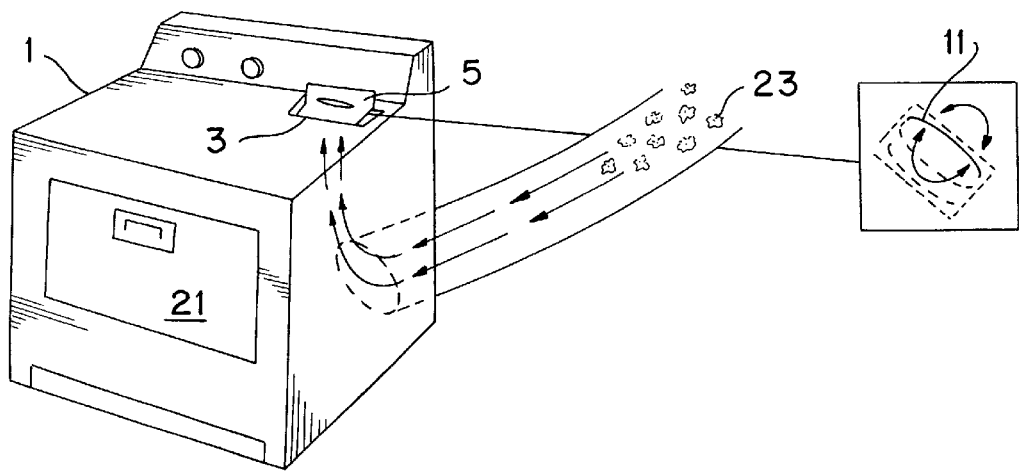
FIG. 4 is a side view of the preferred embodiment of the invention as used with a clothes dryer whose exhaust vent is partially obstructed with an enlarged view of the action of the invention's impeller to the right.

FIG. 4 is a side view of the preferred embodiment of the invention as used with a clothes dryer whose exhaust vent is partially obstructed with an enlarged view of the action of the invention's impeller to the right. In this state or operational mode, the partially blocked exhaust system there is an irregular flow of air back to the impeller resulting in its back and forth movement that starts and stops. The lint and other foreign matter 23 is shown as spaced apart in this figure. The arrows indicate the general type of intermittent impeller 11 movement as shown in the enlargement to the right.

When there is either a complete blockage of the exhaust system (FIG. 3) by lint or other foreign matter or a partial blockage (FIG. 4) of the exhaust system, the user can simply remove the obstructing matter from the exhaust system and save the cost and inconvenience of calling a repair person. The end flapper valve for the exhaust system 19 may be inoperative/stuck closed or the vent tubes may be blocked or the blower wheel for the dryer may not be working at all.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A combination of an air flow testing device and a clothing dryer comprising:

a clothes dryer having a lint screen opening and an exhaust system for exhausting heated air from the dryer;

a casing mounted on the lint screen opening, said casing having a transparent wall and generally closed except for an opening in the casing;

an air tight seal mounted between the casing and the lint screen opening; and an impeller blade rotatably mounted within the casing and in communication with the exhausted heated air from the dryer.

2. The combination as claimed in claim 1, wherein the impeller blade is mounted to the casing by two opposite members fixed to the blade and rotatably mounted to the casing.

3. The combination as claimed in claim 1, wherein said casing is made of a clear plastic material and said air tight seal extending around the opening of the casing to provide the air tight seal between the lint screen opening and the opening of the casing.

* * * * *